US010080013B2

(12) United States Patent
Shikata et al.

(10) Patent No.: US 10,080,013 B2
(45) Date of Patent: Sep. 18, 2018

(54) IMAGE DISPLAY DEVICE AND METHOD, AS WELL AS PROGRAM

(75) Inventors: Daisuke Shikata, Miyagi (JP); Junji Hayashi, Miyagi (JP); Satoshi Yanagita, Miyagi (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 12/835,607

(22) Filed: Jul. 13, 2010

(65) Prior Publication Data

US 2011/0018968 A1    Jan. 27, 2011

(30) Foreign Application Priority Data

Jul. 21, 2009 (JP) .................................. 2009-169664

(51) Int. Cl.
*H04N 13/04* (2006.01)
*H04N 13/31* (2018.01)
(Continued)

(52) U.S. Cl.
CPC ......... *H04N 5/23293* (2018.05); *H04N 5/23293* (2013.01); *H04N 13/007* (2013.01); *H04N 13/0022* (2013.01); *H04N 13/0029* (2013.01); *H04N 13/0066* (2013.01); *H04N 13/0203* (2013.01); *H04N 13/0296* (2013.01); *H04N 13/0402* (2013.01); *H04N 13/0409* (2013.01);
(Continued)

(58) Field of Classification Search
CPC ........... H04N 13/0239; H04N 13/0497; H04N 13/0055; H04N 13/0296
USPC ............................ 348/47, 46, 51, 42, 43, 44
See application file for complete search history.

(56) References Cited

U.S. PATENT DOCUMENTS 6,111,597 A * 8/2000 Tabata ............... G02B 27/2264
345/8
6,384,859 B1 * 5/2002 Matsumoto .............. G06K 9/20
348/43
(Continued)

FOREIGN PATENT DOCUMENTS

JP   H09-51552 A    2/1997
JP   H 09-130513 A    5/1997
(Continued)

OTHER PUBLICATIONS

European Search Report dated Jan. 25, 2011.
(Continued)

*Primary Examiner* — Shawn An
(74) *Attorney, Agent, or Firm* — McGinn I. P. Law Group, PLLC.

(57) ABSTRACT

A stereoscopic image is generated by applying three-dimensional processing to two or more images, which are obtained through photographing from different positions. The stereoscopic image is stereoscopically displayed, and an instruction to start changing a parallax level of the stereoscopic image is received. In response to the instruction to start changing the parallax level, stereoscopic display of the stereoscopic image is switched into two-dimensional display of the two or more images overlapped with each other. An instruction to change the parallax level is received. In response to the instruction to change the parallax level, the two or more images are two-dimensionally displayed with the parallax level of the images being changed.

20 Claims, 14 Drawing Sheets

(51) Int. Cl.

| | | |
|---|---|---|
| *H04N 13/128* | (2018.01) | |
| *H04N 13/139* | (2018.01) | |
| *H04N 13/178* | (2018.01) | |
| *H04N 13/183* | (2018.01) | |
| *H04N 13/204* | (2018.01) | |
| *H04N 13/296* | (2018.01) | |
| *H04N 13/302* | (2018.01) | |
| *H04N 13/359* | (2018.01) | |
| *H04N 13/398* | (2018.01) | |
| *H04N 5/232* | (2006.01) | |
| *H04N 13/00* | (2018.01) | |
| *H04N 13/02* | (2006.01) | |

(52) U.S. Cl.
CPC ..... *H04N 13/0454* (2013.01); *H04N 13/0497* (2013.01); *H04N 13/128* (2018.05); *H04N 13/139* (2018.05); *H04N 13/178* (2018.05); *H04N 13/183* (2018.05); *H04N 13/204* (2018.05); *H04N 13/296* (2018.05); *H04N 13/302* (2018.05); *H04N 13/359* (2018.05); *H04N 13/398* (2018.05)
USPC .......................................................... 348/46

(56) References Cited

U.S. PATENT DOCUMENTS

| | | | | |
|---|---|---|---|---|
| 7,102,686 | B1* | 9/2006 | Orimoto | G03B 35/08 348/231.7 |
| 7,417,664 | B2* | 8/2008 | Tomita | G02B 27/0093 348/43 |
| 7,720,308 | B2* | 5/2010 | Kitaura et al. | 382/285 |
| 8,045,070 | B2* | 10/2011 | Park | G02F 1/13471 349/110 |
| 2003/0048354 | A1* | 3/2003 | Takemoto | H04N 13/312 348/51 |
| 2006/0192776 | A1* | 8/2006 | Nomura | H04N 13/0022 345/419 |
| 2006/0268159 | A1 | 11/2006 | Orimoto et al. | |
| 2008/0158346 | A1* | 7/2008 | Okamoto | H04N 5/23238 348/47 |
| 2009/0058878 | A1* | 3/2009 | Sasagawa | 345/593 |
| 2012/0019532 | A1* | 1/2012 | Yanagita | H04N 13/0018 345/419 |

FOREIGN PATENT DOCUMENTS

| | | |
|---|---|---|
| JP | 9-192349 | 7/1997 |
| JP | 10-90814 | 4/1998 |
| JP | 11-355624 A | 12/1999 |
| JP | 2001-236521 A | 8/2001 |
| JP | 2004-129186 | 4/2004 |
| JP | 2004207933 A | 7/2004 |
| JP | 2005-73013 A | 3/2005 |
| JP | 2005-073038 A | 3/2005 |
| JP | 2005-110120 A | 4/2005 |
| JP | 2005-142819 A | 6/2005 |
| JP | 2008-167066 A | 7/2008 |
| JP | 2008-310696 A | 12/2008 |

OTHER PUBLICATIONS

Extended European Search Report dated Jun. 25, 2012.
Extended European Search Report dated May 21, 2012.
Notification of the Second Chinese Office Action dated Sep. 21, 2012, with English translation.
European Search Report dated Mar. 8, 2013 (European Patent Application No. 12 001 816.3).
European Search Report dated Mar. 8, 2013 (European Patent Application No. 12 001 817.1)
Notification of the Third Chinese Office Action dated Jan. 29, 20136 with an English translation thereof.
Notice of Grounds for Rejection, dated Nov. 27, 2912 with English translation.
Japanese Office Action dated Jun. 11, 2013 with partial English translation thereof.
Japanese Office Action dated Oct. 20, 2015 with English Translation.
European Office Actions dated Oct. 30, 2014.
United States Notice of Allowance dated Dec. 24, 2014 in U.S. Appl. No. 13/833,237.
Chinese Office Action dated Feb. 15, 2015 with an English Translation, cited in co-pending U.S. Appl. No. 13/833,237.
United States Office Action dated Aug. 20, 2014 in U.S. Appl. No. 13/833,237.
Japanese Office Action dated Aug. 12, 2014 with partial English Translation.

\* cited by examiner

SHOULD THE CURRENT
PARALLAX LEVEL
BE SAVED?

YES   NO

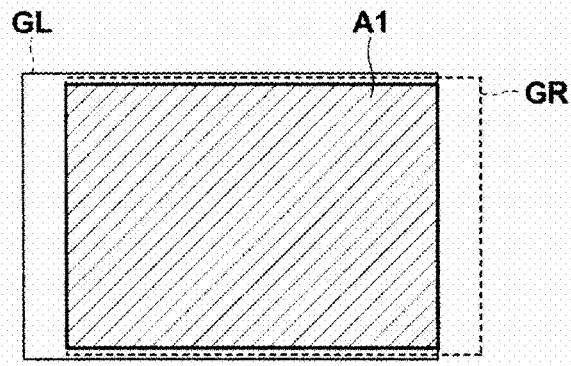
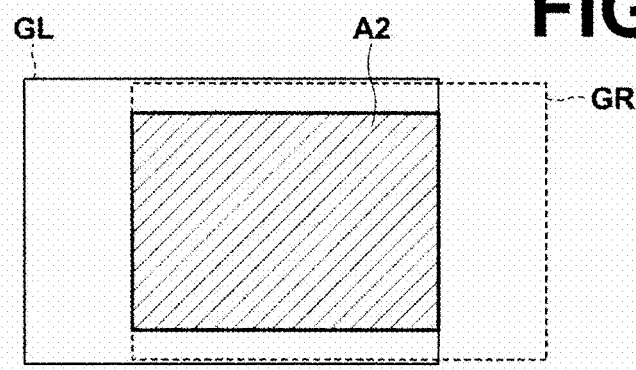
FIG.12
FIG.13
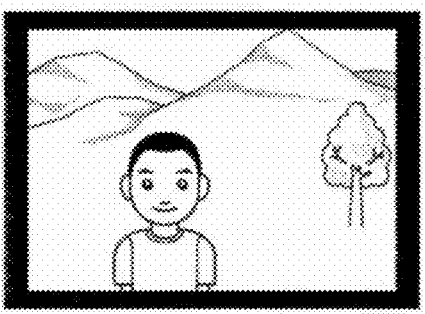
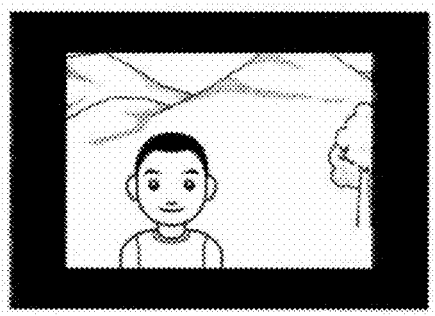
SMALL PARALLAX LEVEL    LARGE PARALLAX LEVEL

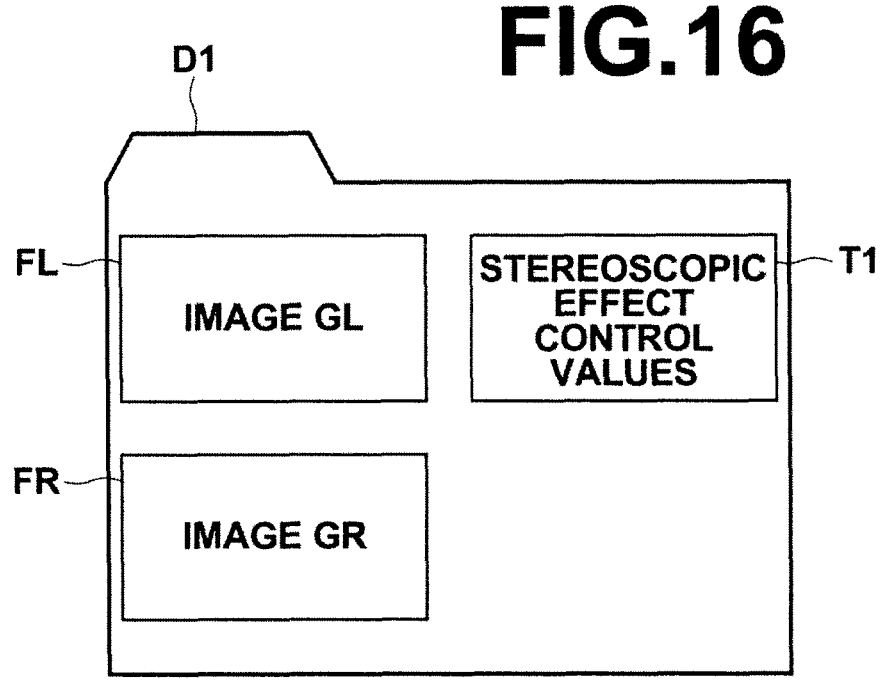
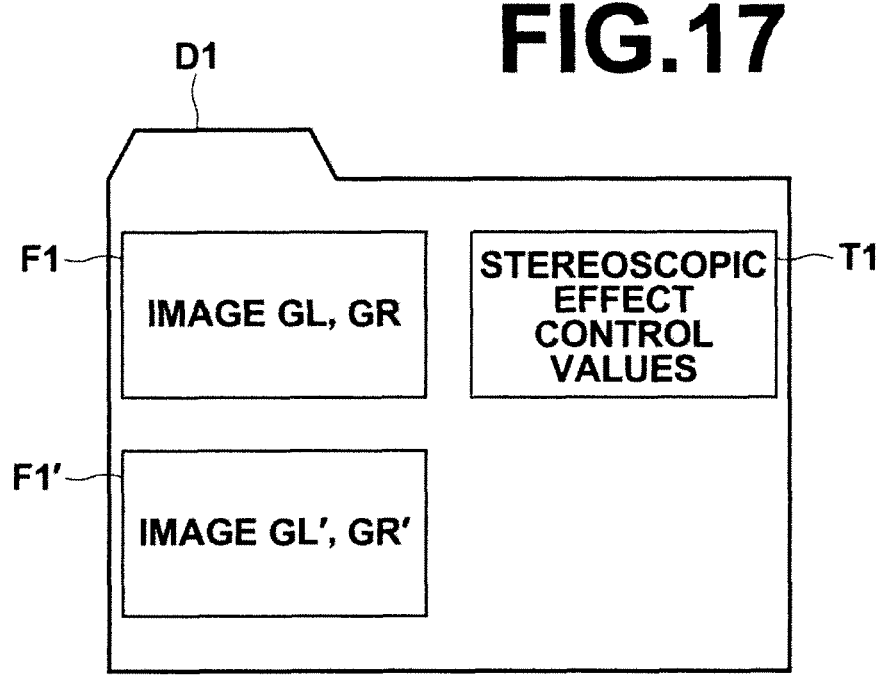

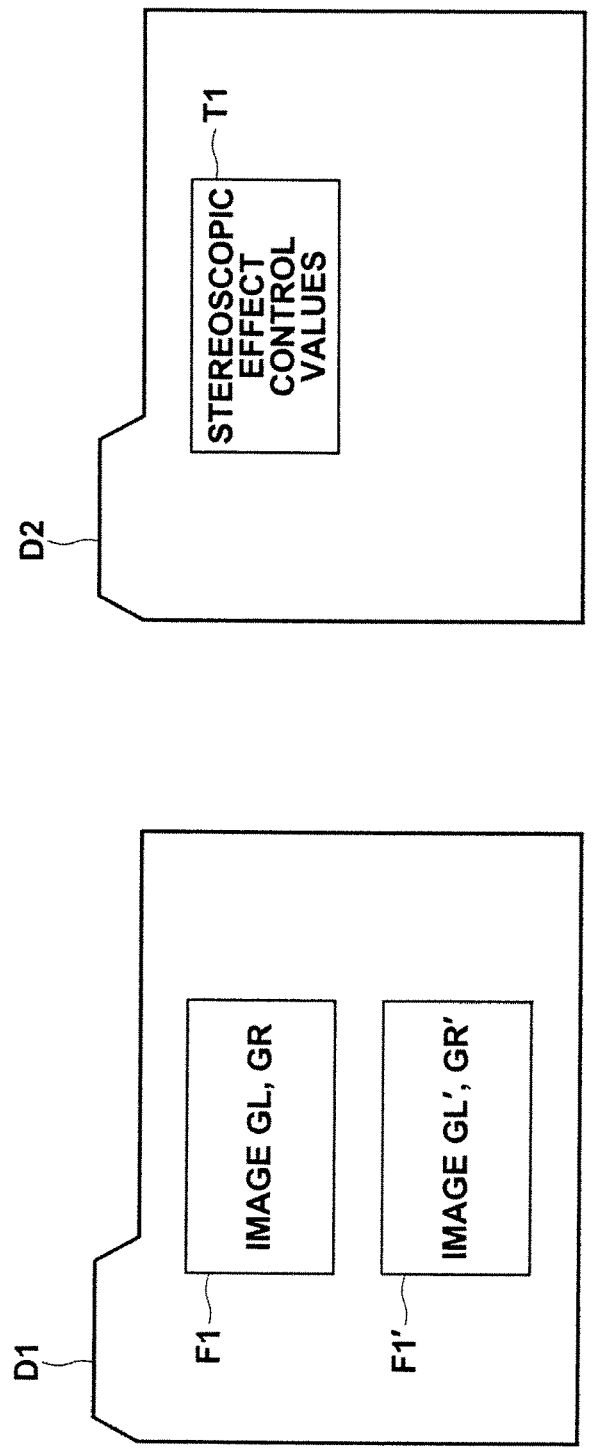

IMAGE DISPLAY DEVICE AND METHOD, AS WELL AS PROGRAM

BACKGROUND OF THE INVENTION

Field of the Invention

The present invention relates to image display device and method for stereoscopically displaying a stereoscopic image generated from two or more images to allow stereoscopic viewing of the image, as well as a program for causing a computer to carry out the image display method.

Description of the Related Art

It has been known to provide stereoscopic viewing with using parallax by combining two or more images, which are obtained through photographing the same subject from different positions, to generate a stereoscopic image, and stereoscopically displaying the thus generated stereoscopic image. As a specific example of a technique to achieve the stereoscopic display, parallel viewing with naked eyes is known, where the stereoscopic display is achieved by arranging the two or more images side by side. Further, the stereoscopic display may be achieved by generating a stereoscopic image by combining the two or more images, for example, by overlapping the images with changing the colors of the images into colors different from each other, such as red and blue, or by overlapping the images with providing different polarization directions of the images. In these cases, the stereoscopic viewing is effected by using image separating glasses, such as red-and-blue glasses or polarization glasses, to provide a merged view, which is attained via the automatic focusing function of the eyes, of the stereoscopically displayed stereoscopic image (anaglyph system, polarization filter system).

The stereoscopic viewing can also be achieved without using the polarization glasses, etc, by displaying the two or more images on a stereoscopic display monitor which allows the stereoscopic viewing of the images, such as in a parallax barrier system or a lenticular system. In this case, the stereoscopic display is achieved by cutting the two or more images into vertical strips and alternately arranging the strips to generate a stereoscopic image, and disposing a light shielding barrier having slits. Further, a method for providing the stereoscopic display using afterimage effect has been proposed, in which left and right images are alternately displayed by being switched at a high speed with changing the direction of rays from the left and right images through the use of the image separation glasses or attaching an optical element on a liquid crystal display (backlight control system).

When the stereoscopic viewing is provided as described above, a preferred level of stereoscopic effect varies among users who view the stereoscopic images. Since the stereoscopic effect changes depending on an amount of disparity (parallax) between the two or more images for stereoscopic viewing, a technique to generate a stereoscopic image has been proposed, which involves receiving an instruction to control the parallax level of the stereoscopic image while the image is stereoscopically displayed, and generating a modified stereoscopic image according to the instructed parallax level (see Japanese Unexamined Patent Publication No. 2004-129186, which is hereinafter referred to as Patent Document 1). Another technique to generate a stereoscopic image has been proposed, where the stereoscopic effect is controlled while the stereoscopic image being displayed is stereoscopically viewed (see Japanese Unexamined Patent Publication No. 10 (1998)-090814, which is hereinafter referred to as Patent Document 2). A technique to control the stereoscopic effect during a video game has also been proposed (see Japanese Unexamined Patent Publication No. 9 (1997)-192349, which is hereinafter referred to as Patent Document 3).

In the techniques disclosed in Patent Documents 1 to 3, however, although the stereoscopic effect can be changed by adjusting the parallax level, adjustment of the stereoscopic effect is performed with the user viewing the stereoscopically displayed image, and therefore the amount of change of the parallax level is not readily recognized.

SUMMARY OF THE INVENTION

In view of the above-described circumstances, the present invention is directed to allowing to facilitate checking the parallax level during adjustment of the stereoscopic effect of stereoscopic images.

An aspect of an image display device according to the invention includes: display means capable of stereoscopically displaying a stereoscopic image generated from two or more images obtained through photographing from different positions; three-dimensional processing means for applying three-dimensional processing for stereoscopic display to the two or more images to generate the stereoscopic image; input means for receiving an instruction to start changing a parallax level of the stereoscopic image and an instruction to change the parallax level; and display control means for switching stereoscopic display of the stereoscopic image into two-dimensional display of the two or more images overlapped with each other in response to the instruction to start changing the parallax level, and two-dimensionally displaying the two or more images with changing the parallax level of the images in response to the instruction to change the parallax level.

In the image display device according to the invention, in a case where the stereoscopic display is achieved using a backlight control system and the display means is a liquid crystal display means, the display control means may drive backlights of the display means in a three-dimensional mode during the stereoscopic display and may drive the backlights in a two-dimensional mode during the two-dimensional display.

In the image display device according to the invention, when the instruction to change the parallax level is received, the display control means may display a display range of the two or more images during the stereoscopic display in a visually recognizable manner on the display means according to an amount of change of the parallax level.

The description "a display range of the two or more images during the stereoscopic display in a visually recognizable manner" herein means providing the user with visual recognition of the size of the display range during the stereoscopic display before and after changing the parallax level, without changing the size of the two or more images, for example, by adding a frame around the displayed image and changing the size of the frame, without changing the display size of the two or more images.

The image display device according to the invention may further include notifying means for notifying, in a case where an area with substantially zero parallax between the two or more images is present, of the fact that the area with substantially zero parallax is present.

The "notifying" herein may be achieved by changing the color of the area with zero parallax in the two-dimensionally displayed images, or with a sound which indicates that an area with substantially zero parallax is present.

The image display device according to the invention may further include recording control means for recording an amount of change of the parallax level according to the instruction in a recording medium with the amount of change of the parallax level being associated with the two or more images.

In the image display device according to the invention, the display control means may switch, after the switching into the two-dimensional display, the two-dimensional display into the stereoscopic display when a predetermined operation is received.

In the image display device according to the invention, the display control means may switch, after the switching into the two-dimensional display, the two-dimensional display into the stereoscopic display when a predetermined period of time has elapsed.

In the image display device according to the invention, the display control means may display the parallax level during the two-dimensional display.

An aspect of a photographing apparatus according to the invention includes: two or more photographing means for obtaining two or more images for stereoscopic display through photographing from different positions; and the image display device according to the invention.

An aspect of the image display method according to the invention includes the steps of: generating a stereoscopic image by applying three-dimensional processing to two or more images, the two or more images obtained through photographing from different positions; stereoscopically displaying the stereoscopic image; receiving an instruction to start changing a parallax level of the stereoscopic image; switching stereoscopic display of the stereoscopic image into two-dimensional display of the two or more images overlapped with each other in response to the instruction to start changing the parallax level; receiving an instruction to change the parallax level; and two-dimensionally displaying the two or more images with changing the parallax level of the images in response to the instruction to change the parallax level.

The invention may be provided in the form of a program for causing a computer to carry out the image display method of the invention.

According to the invention, when an instruction to change the parallax level is made by the user, stereoscopic display of the two or more images is switched into two-dimensional display of the two or more images overlapped with each other. This facilitates the user to check the level of parallax between the two or more images when the user adjust the stereoscopic effect by changing the parallax level.

The stereoscopic display is achieved using an overlapping range between the two or more images. Therefore, the larger the parallax level, the smaller the area trimmed out from the two or more images for the stereoscopic display. As a result, the stereoscopic image to be stereoscopically displayed is enlarged from the original images. However, in this case, the change of the display size of the image may catch the user's eyes and may hinder the user from determining an appropriate parallax level.

By displaying the display range of the two or more images in a visually recognizable manner according to the amount of change of the parallax level, the displayed image is not enlarged. With this, the user can concentrate on control of the parallax level, and thus can efficiently control the parallax level.

Further, when an area with zero parallax between the two or more images is present, the fact is notified. This allows the user to efficiently carry out the operation when the user wishes to provide a desired area with zero parallax between the images.

Furthermore, the instructed amount of change of the parallax level is stored with being associated with the original images before subjected to the three-dimensional processing. Thus, when it is desired to change the stereoscopic effect later, the three-dimensional processing is applied again to the original images to change the stereoscopic effect.

BRIEF DESCRIPTION OF THE DRAWINGS

FIG. 12 is a diagram for explaining how a trimming area is changed depending on a parallax level, FIG. 13 is a diagram illustrating a state where a black frame is added around a stereoscopic image, FIG. 16 is a diagram illustrating how the image files and a text file of the stereoscopic effect control values are stored, FIG. 17 is another diagram illustrating how the image files and the text file of the stereoscopic effect control values are stored, and FIG. 18 is still another diagram illustrating how the image files and the text file of the stereoscopic effect control values are stored.

DESCRIPTION OF THE PREFERRED EMBODIMENTS

Figure 1:
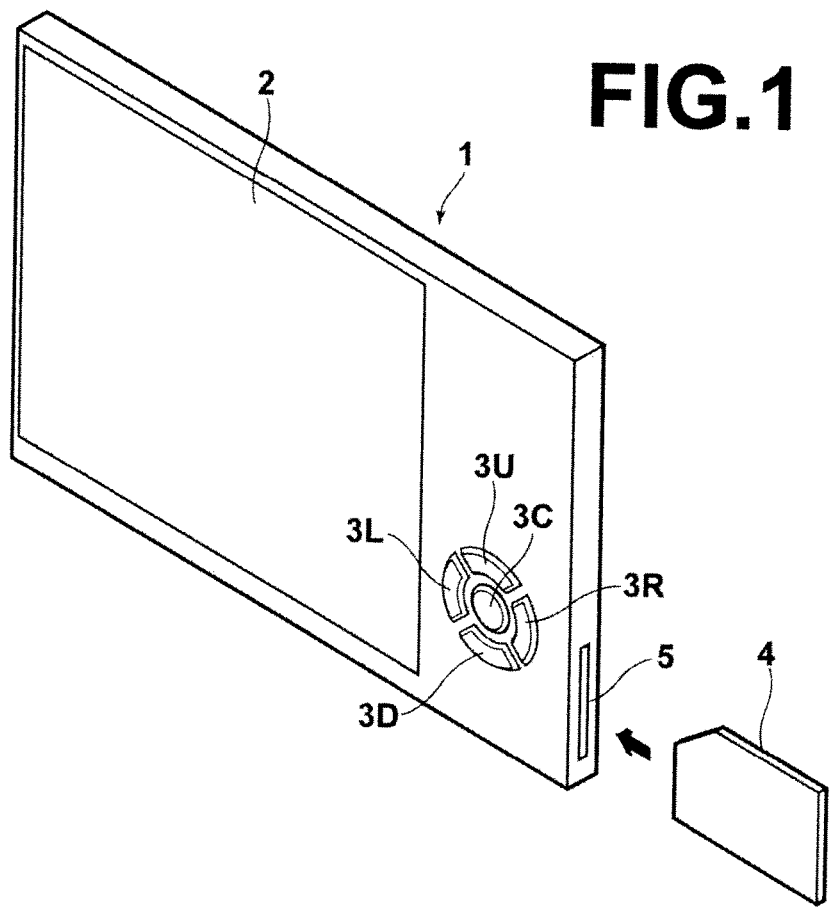
FIG. 1 is a perspective view illustrating the appearance of an image display device according to an embodiment of the present invention.

Hereinafter, an embodiment of the present invention will be described with reference to the drawings. FIG. 1 is a perspective view illustrating the appearance of an image display device according to the embodiment of the invention. As shown in FIG. 1, the image display device 1 according to this embodiment includes a liquid crystal display (LCD) 2 and a manual operation button 3 at the front side thereof. The image display device 1 further includes, on a lateral side thereof, a slot 5 for receiving a recording medium 4, such as a memory card, inserted therein. The image display device 1 according to this embodiment stereoscopically displays, on the LCD 2, a stereoscopic image generated from two or more images, which have been obtained by photographing the same subject from different positions and recorded in the recording medium 4. In the description of this embodiment, it is assumed that the stereoscopic display is carried out using two images GL and GR. The image GL is the image for the left eye and the image GR is the image for the right eye during the stereoscopic display.

The manual operation button 3 includes an upper button 3U, a lower button 3D, a left button 3L, a right button 3R and a center button 3C.

Figure 2:
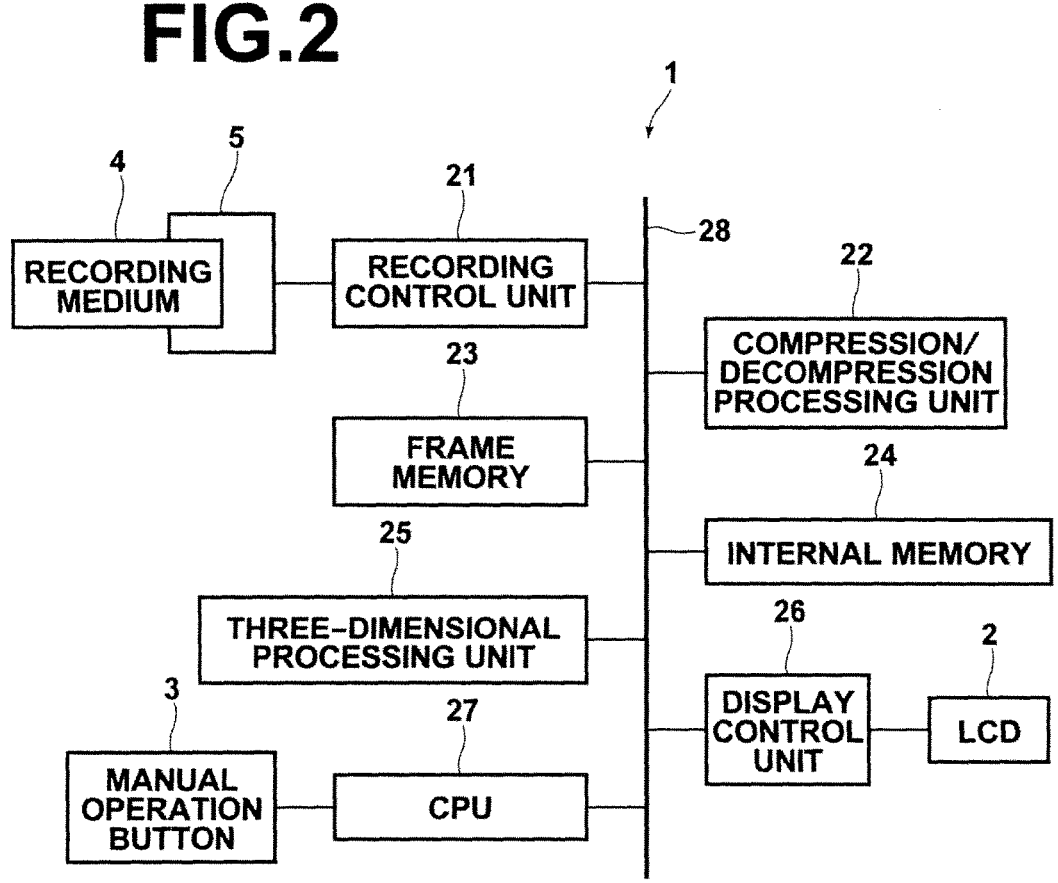
FIG. 2 is a schematic block diagram illustrating the internal configuration of the image display device according to the embodiment of the invention.

FIG. 2 is a schematic block diagram illustrating the internal configuration of the image display device according to this embodiment. As shown in FIG. 2, the image display device 1 includes a recording control unit 21, a compression/decompression processing unit 22, a frame memory 23, an internal memory 24, a three-dimensional processing unit 25, a display control unit 26 and a CPU 27.

The recording control unit 21 controls recording and reading of information into and from the recording medium 4 inserted in the slot 5. Further, the recording control unit 21 writes stereoscopic effect control values based on the parallax level changed by the user, as will be described later, in tags of image files of the images GL and GR.

The compression/decompression processing unit 22 carries out compression and decompression of the two images GL and GR to be stereoscopically displayed, which are read out from the recording medium 4. A tag storing the stereoscopic effect control values, which will be described later, and associated information, such as photographing time and date, is added to the image files of images GL and GR, based on the Exif format, for example.

The frame memory 23 is a work memory for various processing operations including three-dimensional processing, which will be described alter, to be applied to image data representing the images GL and GR. As the frame memory 23, a dynamic RAM, which is a volatile memory, is commonly used in view of costs.

The internal memory 24 stores various constants to be set within the image display device 1, programs to be executed by the CPU 27, etc. As the internal memory 24, a non-volatile memory is used so that the data stored therein is not deleted when the power of the camera is turned off, and therefore, it is possible to record the photographed images in this memory.

The three-dimensional processing unit 25 applies the three-dimensional processing to the images GL and GR to generate a stereoscopic image for stereoscopically displaying the images GL and GR on the LCD 2. The technique used in this embodiment to achieve the stereoscopic display may be any of known techniques. For example, the images GL and GR may be displayed side by side to achieve the stereoscopic viewing through parallel viewing with naked eyes, or a lenticular system may be used, in which a lenticular lens is attached on the LCD 2, and the images GL and GR are displayed at predetermined positions on the display surface of the LCD 2 so that the images GL and GR are respectively viewed by the left and right eyes to achieve the stereoscopic display. Further, a parallax barrier system may be used, in which a barrier for changing optical paths to the left and right eyes is attached on the LCD 2, and the images GL and GR are displayed at predetermined positions on the display surface of the LCD 2 so that the images GL and GR are respectively viewed by the left and right eyes to achieve the stereoscopic display.

The stereoscopic display may also be achieved by combining the images GL and GR by overlapping the images GL and GR with changing the colors of the images GL and GR into colors different from each other, for example, red and blue, or by overlapping the images GL and GR with providing different polarization directions of the images GL and GR (anaglyph system, polarization filter system). Further, a backlight control system may be used, which achieves the stereoscopic display by optically separating the optical paths of the backlights of the LCD 2 correspondingly to the left and right eyes in an alternating manner, and alternately displaying the images GL and GR on the display surface of the LCD 2 according to the separation of the backlights to the left and right.

Figure 3:
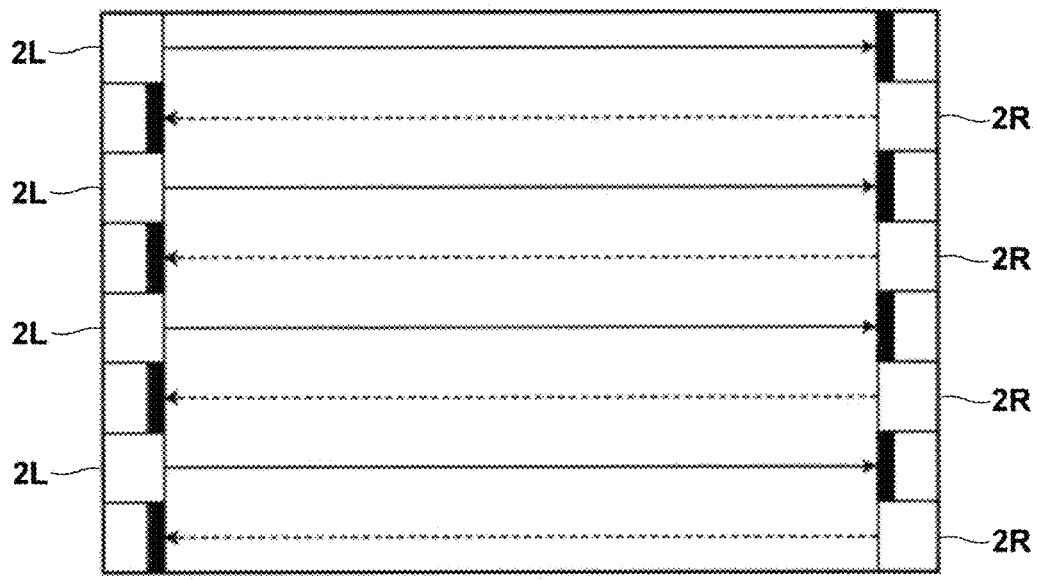
FIG. 3 is a diagram illustrating the structure of backlights of an LCD of a backlight control system.

The LCD 2 is modified according to the type of the three-dimensional processing carried out by the three-dimensional processing unit 25. For example, in the case where the stereoscopic display is implemented with the lenticular system, a lenticular lens is attached on the display surface of the LCD 2. In the case of the parallax barrier system, a barrier is attached on the surface of the LCD 2. In the case of the backlight control system, an optical element for changing directions of the rays from the left and right images is attached on the display surface of the LCD 2. In this embodiment, the stereoscopic display is achieved using the backlight control system. Therefore, the LCD 2 includes backlights 2L for the left eye and backlights 2R for the right eye, as shown in FIG. 3. In the following description, optical paths of the backlights 2L for the left eye are indicated by solid lines, and optical paths of the backlights 2R for the right eye are indicated by dashed lines.

The three-dimensional processing unit 25 applies image processing, such as white balance correction, tone correction, sharpness correction and color correction, to the images GL and GR. It should be noted that a separate image processing unit for applying the image processing may be provided besides the three-dimensional processing unit 25.

The three-dimensional processing unit 25 changes the parallax level of the images GL and GR to regenerate a stereoscopic image G3 according to the stereoscopic effect controlled by the user via the manual operation button 3, as will be described later, and stereoscopically displays the regenerated stereoscopic image G3.

The display control unit 26 stereoscopically displays the stereoscopic image G3 obtained through the three-dimensional processing or two-dimensionally displays the images GL and GR being overlapped with each other, according to an instruction made by the user via the manual operation button 3.

Figure 4:
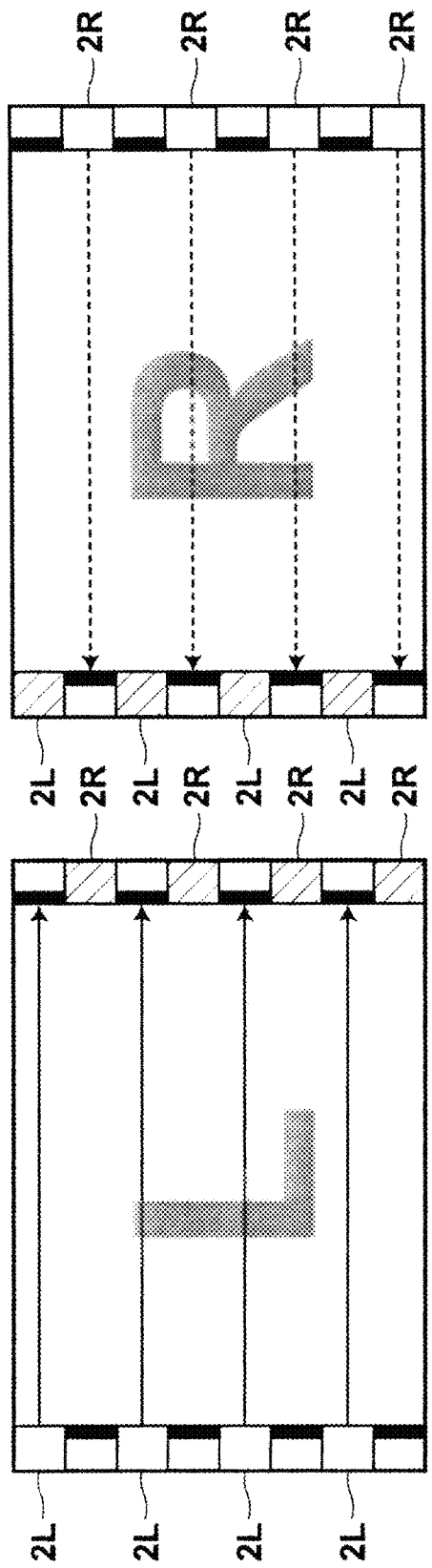
FIG. 4 is a diagram for explaining stereoscopic display with the backlight control system.

Namely, when the stereoscopic display is carried out, an operation to turn on the backlights 2L for the left eye and display the image GL for the left eye and an operation to turn on the backlights 2R for the right eye and display the image GR for the right eye, as shown in FIG. 4, are continuously switched at a high speed (for example, 60 Hz) to provide the stereoscopic effect using the afterimage effect (three-dimensional mode). In FIG. 4, turned-off backlights are indicated with hatching. The displayed image GL or GR is represented by the symbol "L" or "R".

Figure 5:
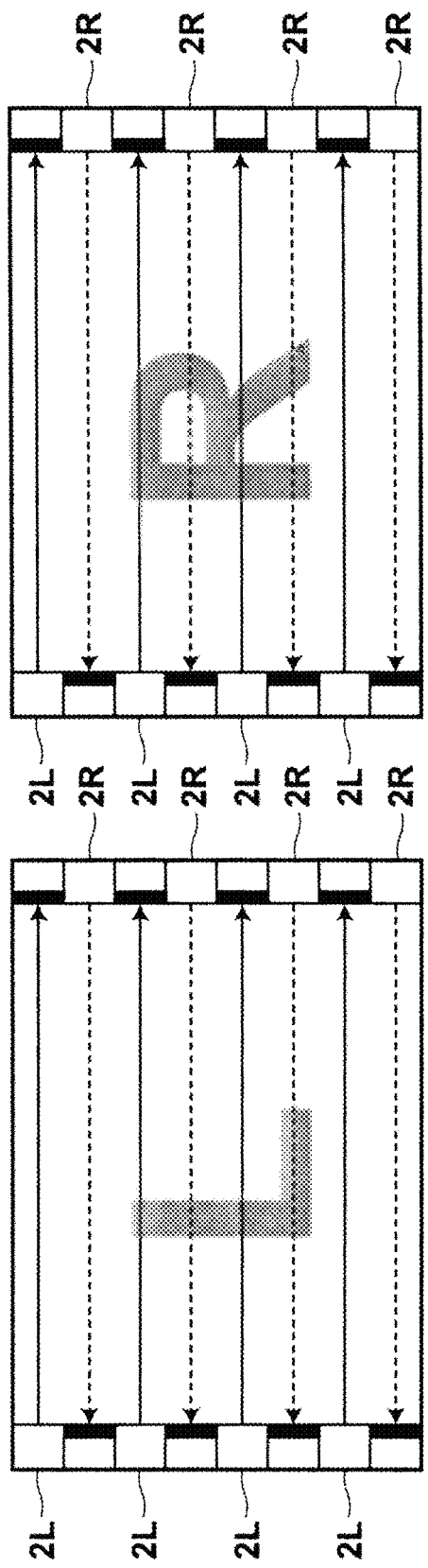
FIG. 5 is a diagram for explaining two-dimensional display with the backlight control system.
Figure 6:
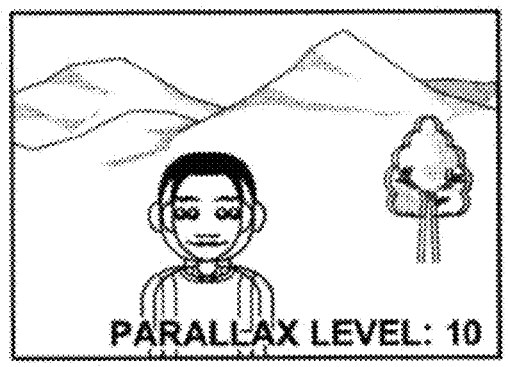
FIG. 6 is a diagram illustrating a two-dimensionally displayed state.

On the other hand, when the two-dimensional display is carried out, the backlights 2L and 2R for the left and right eyes are simultaneously turned on, as shown in FIG. 5, and display of the image GL for the left eye and display of the image GR for the right eye are continuously switched at a high speed to effect overlapped display of the two images GL, GR, as shown in FIG. 6 (two-dimensional mode).

The CPU 27 controls the units of the image display device 1 according to instructions fed via the manual operation button 3.

The data bus 28 is connected to the units and the CPU 27 forming the image display device 1 for communication of various data and information in the image display device 1.

Figure 7:
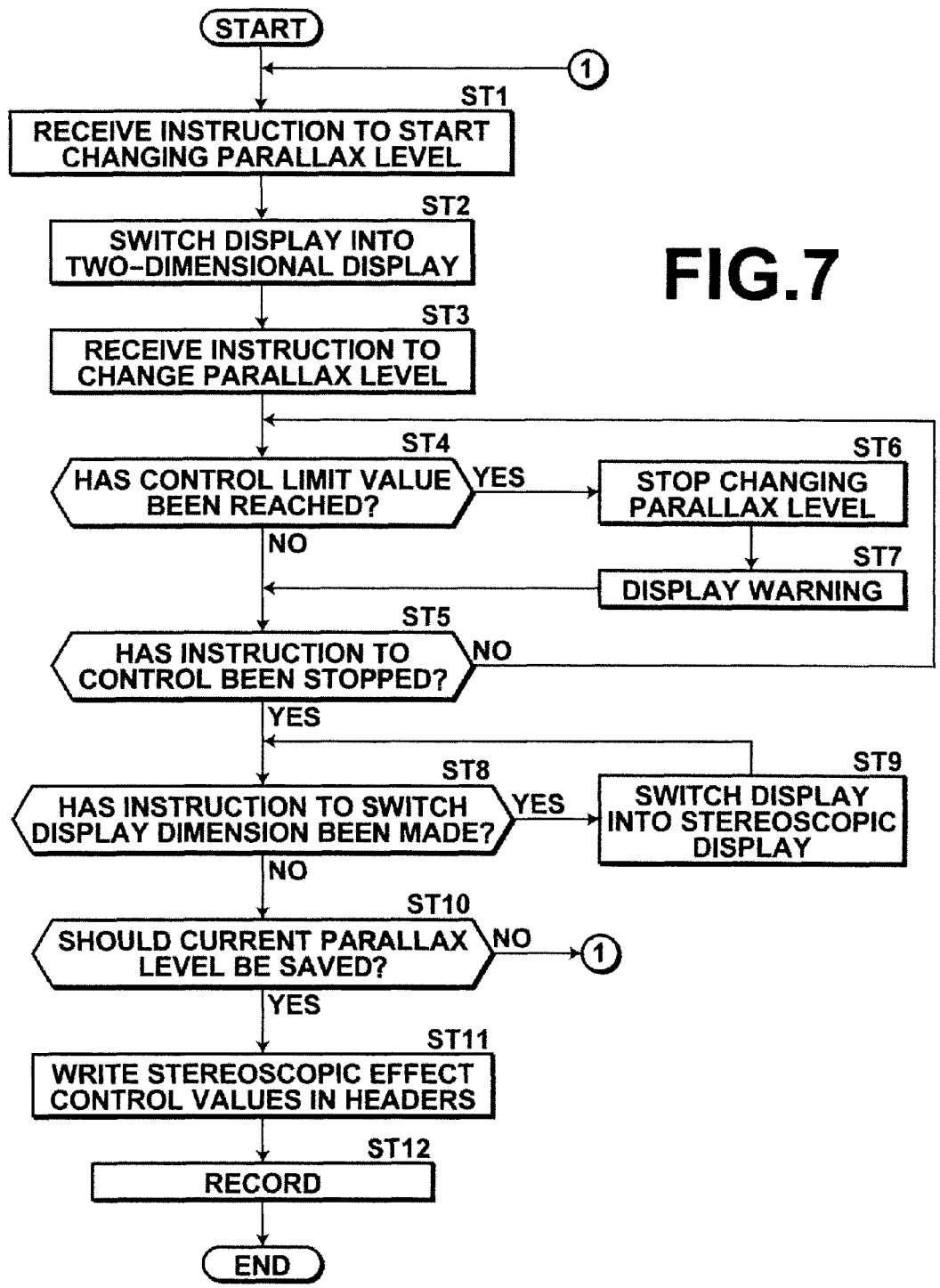
FIG. 7 is a flow chart illustrating a process that is carried out during stereoscopic effect control in the embodiment of the invention.

Next, a process carried out in this embodiment is described. FIG. 7 is a flow chart illustrating a process that is carried out during the stereoscopic effect control, i.e., changing the parallax level, in the embodiment. In this description, it is assumed that the three-dimensional processing has been applied to the images GL and GR read out from recording medium 4 without changing the parallax level, and the thus generated stereoscopic image G3 is stereoscopically displayed on the LCD 2. The CPU 27 starts the process when the stereoscopic image G3 is stereoscopically displayed, and receives an instruction to start changing the parallax level made by the user via the manual operation button 3 (step ST1). The instruction to start changing the parallax level is made via the center button 3C, for example, of the manual operation button 3. With this, the display control unit 26 switches the display dimension of the currently displayed image into two-dimensional display (step ST2). As shown in FIG. 6, the two images GL and GR are two-dimensionally displayed on the LCD 2 to appear as being overlapped with each other. It should be noted that the parallax level between the two images GL and GR may be displayed during the two-dimensional display. In the example shown in FIG. 6, a text "parallax level: 10" is displayed. Further, the CPU 27 receives an instruction to change the parallax level made by the user via the manual operation button 3 (step ST3).

Figures 8, 9:
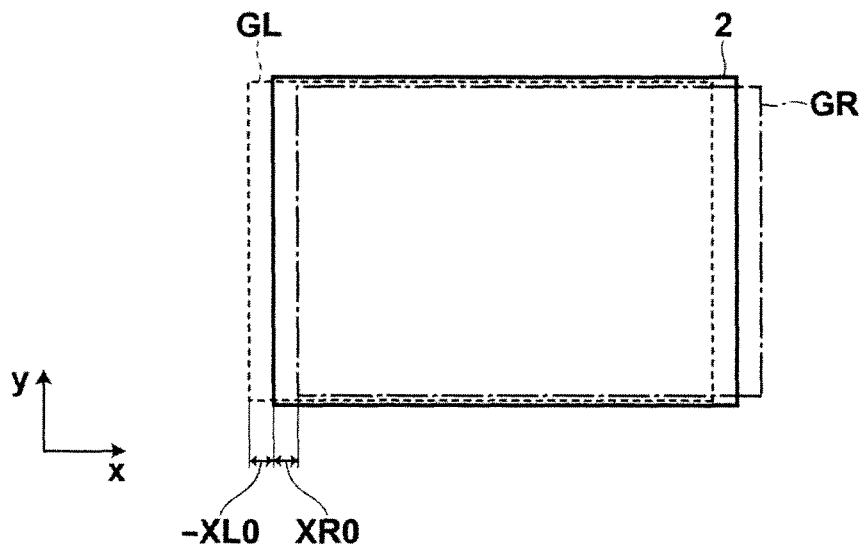
FIG. 8 is a diagram for explaining how a parallax level is changed.
FIG. 9 is a diagram illustrating a query screen for determining whether or not a current parallax level should be saved.

FIG. 8 is a diagram for explaining how the parallax level is changed. In FIG. 8, the solid line indicates a display range of the LCD 2, the dashed line indicates the image GL, and the dashed-dotted line indicates the image GR. As shown in the drawing, the image GL is deviated from a predetermined parallax reference by an amount of −XL0 and the image GR is deviated from the parallax reference by an amount of XR0. Although the images GL and GR and the LCD 2 actually have the same size in the longitudinal direction, they are shown with different sizes in the longitudinal direction for the convenience of explanation. Since the images GL and GR are obtained by photographing the same subject from different positions, there is a predetermined parallax (XR0+XL0 in the example shown in FIG. 8) between the images of the subject contained in the images GL and GR, as can be seen when the images GL and GR are overlapped with each other. Therefore, stereoscopic viewing can be provided by applying the three-dimensional processing to the images GL and GR to generate a stereoscopic image and stereoscopically displaying the stereoscopic image.

However, since a preferred level of the stereoscopic effect varies among users, the instruction to change the parallax level made by the user via the manual operation button 3 is received, and the parallax level of the images GL and GR is changed in this embodiment. For example, in this embodiment, the parallax level is changed such that a smaller parallax level is provided when the left button 3L of the manual operation button 3 is pressed, and a larger parallax level is provided when the right button 3R is pressed. In the case where the parallax level is displayed, the displayed parallax level is changed when the right button 3R or the left button 3L is pressed.

Subsequently, the CPU 27 determines whether or not the parallax level has been changed to reach a control limit value (step ST4). The control limit value of the parallax level refers to a control value at which, for example, each of the images GL and GR is shifted to reach an opposite end of the other image. If the determination in step ST4 is negative, then, determination is made as to whether or not the user has released the hand from the manual operation button 3 to stop the instruction to control (step ST5). If the determination in step ST5 is negative, the process returns to step ST4. If the determination in step ST4 is affirmative, changing of the parallax level is stopped (step ST6), and a warning indicating that no further change can be made to the stereoscopic effect is displayed on the LCD 2 (step ST7), and the process proceeds to step ST5. In this manner, changing of the parallax level is continued to achieve the instructed parallax level until the parallax level reaches the control limit value or the user releases the hand from the manual operation button 3.

If the determination in step ST5 is affirmative, the CPU 27 determines whether or not an instruction to switch the display dimension is made via the manual operation button 3 (step ST8). The instruction to switch the display dimension may be made via the center button 3C, for example, of the manual operation button 3. If the determination in step ST8 is affirmative, the display control unit 26 switches the display dimension of the image into the stereoscopic display (step ST9), and the process returns to step ST8.

If no instruction to switch the display dimension is made within a predetermined period of time, negative determination is made in step ST8, and the CPU 27 displays a query screen for determining whether or nor the current parallax level should be saved, as shown in FIG. 9, on the LCD 2 (step ST10). It should be noted that, when the instruction to switch the display dimension is made, the operation in step ST10 may be carried out immediately after the display dimension of the image is switched into the stereoscopic display in response to the user's operation of the center button 3C. The user can select "YES" or "NO" via the manual operation button 3. If "NO" is selected, the process returns to step ST1. If "NO" is selected, the process returns to step ST1. If "YES" is selected, the recording control unit 21 writes the current parallax level as the stereoscopic effect control values in the headers of the images GL and GR (step ST11) and records the images GL and GR in the recording medium 4 (step ST12), and the process ends. The images GL and GR recorded in the recording medium 4 are overwritten with the images GL and GR having the stereoscopic effect control values written in the headers thereof.

Figure 10:
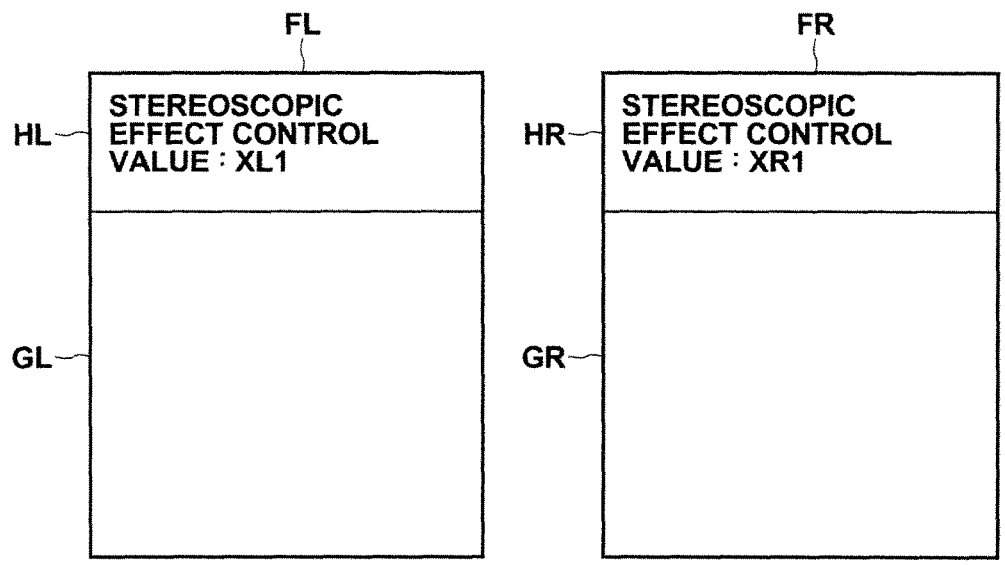
FIG. 10 is a diagram illustrating the file structure of image files having stereoscopic effect control values written in headers thereof.

FIG. 10 is a diagram illustrating the file structure of the image files of the images GL and GR having the stereoscopic effect control values written in the headers thereof. As shown in FIG. 10, the image files FL and FR of the images GL and GR include headers HL and HR and main images (denoted by the same symbols GL and GR as the images), which are substantial data of the images GL and GR. The headers HL and HR contain descriptions of the stereoscopic effect control values. For example, the header HL of the image GL contains a description "XL1" as the stereoscopic effect control value, and the header HR of the image GR contains a description "XR1" as the stereoscopic effect control value.

The stereoscopic effect control values XL1 and XR1 are calculated from the parallax level. For example, when the parallax level is 6 and the parallax reference is set on the middle of the images GL and GR, the stereoscopic effect control values are XL1=3 and XR1=3. The parallax reference may be set on the image GL, and in this case, the stereoscopic effect control values are XL1=0, XR1=6. It should be noted that the method for calculating the stereoscopic effect control values is not limited to the above-described example. The stereoscopic effect control values may be calculated in a manner that is most convenient for the system used.

In the above-described process, the determination is made in step ST8 as to whether the instruction to switch the display dimension is made, and if the instruction to switch is made, the display dimension of the image is switched into the stereoscopic display. However, the display dimension of the image may be switched into the stereoscopic display when a predetermined period of time has elapsed after the instruction to control is stopped.

Figure 11:
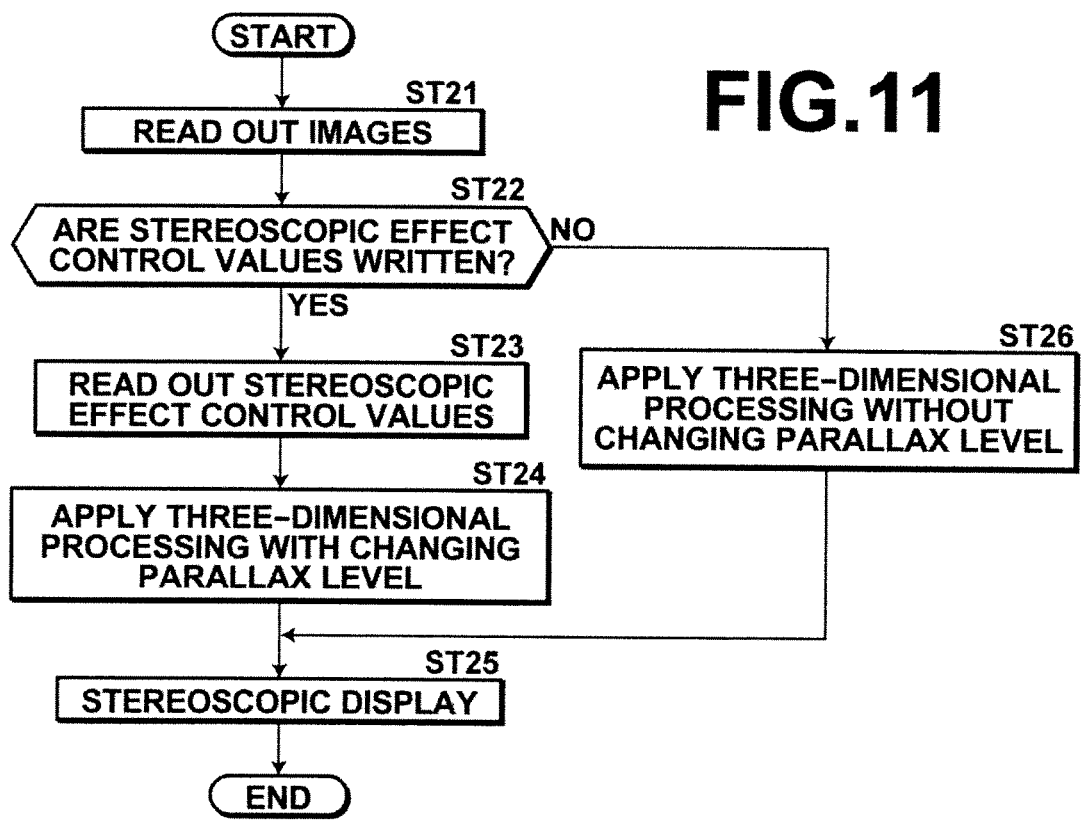
FIG. 11 is a flow chart illustrating a process that is carried out during stereoscopic display.

Next, a process carried out in this embodiment when the images GL and GR recorded in the recording medium 4 are stereoscopically displayed is described. FIG. 11 is a flow chart illustrating the process that is carried out during the stereoscopic display. When an instruction to stereoscopically display the images is made via the manual operation button 3, the CPU 27 starts the process, and the recording control unit 21 reads out the images GL and GR to be displayed from the recording medium 4 and temporarily stores the images GL and GR in the frame memory 23 (step ST21). Then, the three-dimensional processing unit 25 determines whether or not the stereoscopic effect control values are written in the headers of the images GL and GR (step ST22). If the determination in step ST22 is affirmative, the stereoscopic effect control values written in the headers of the images GL and GR are read out (step ST23), and the three-dimensional processing is applied to the images GL and GR to generate the stereoscopic image G3 with changing the parallax level to achieve the parallax level based on the read out stereoscopic effect control values (step ST24). Then, the display control unit 26 stereoscopically displays the stereoscopic image G3 on the LCD 2 (step ST25), and the process ends.

On the other hand, if the determination in step ST22 is negative, the three-dimensional processing is applied to the images GL and GR to generate the stereoscopic image G3 without changing the parallax level (step ST26). Then, the process proceeds to step ST25 to stereoscopically display the stereoscopic image G3, and the process ends.

As described above, in this embodiment, the stereoscopic display of the images GL and GR is switched into the two-dimensional display during changing the parallax level. This facilitates the user to check the parallax level between the images GL and GR.

Further, the stereoscopic effect control values are written in the headers of the original images GL and GR before subjected to the three-dimensional processing and are recorded in the recording medium 4. Thus, if the user wants to change the stereoscopic effect at a later time, the three-dimensional processing is again applied to the original images GL and GR to change the stereoscopic effect.

Further, the stereoscopic effect control values are written in the headers HL and HR of the image files FL and FR of the images GL and GR. Therefore, by applying the three-dimensional processing to achieve the parallax level based on the stereoscopic effect control values written in the headers HL and HR, the images GL and GR can be stereoscopically displayed to have a stereoscopic effect according to the preference of the user who has changed the parallax level. This eliminates the need of changing the parallax level by the user each time the stereoscopic display is carried out, thereby reducing the burden on the user.

It should be noted that, although the stereoscopic display is achieved using the backlight control system in the above-described embodiment, in a case where the stereoscopic display system is a system other than the backlight control system, such as a lenticular system or a parallax barrier system, the two-dimensional display is achieved by displaying the images GL and GR overlapped each other in a semi-transparent state without applying the three-dimensional processing, so that the two images GL and GR appear as being overlapped, as shown in FIG. 6.

When the stereoscopic display is carried out, a larger parallax level of the images GL and GR provides a narrower overlapping area between the images GL and GR, resulting in a narrower display range for the stereoscopic display. That is, as shown in FIG. 12, when the parallax level of the images GL and GR is small, the display range of the images GL and GR, where the images overlap with each other, is as indicated by an area A1 shown in FIG. 12, and when the parallax level is larger, the display range of the images GL and GR, where the images overlap with each other, is smaller than that when the parallax level is small, as indicated by an area A2. It should be noted that the images GL and GR and the areas A1 and A2 have the same aspect ratio.

The stereoscopic display is carried out using the overlapping range between the images GL and GR. Therefore, the larger the parallax level, the smaller the area trimmed out from the images GL and GR for the stereoscopic display. As a result, the stereoscopic image G3 stereoscopically displayed on the LCD 2 is enlarged. In this embodiment, when the parallax level is changed, the stereoscopically displayed stereoscopic image G3 may be enlarged or reduced to change the size thereof depending on the parallax level. However, in this case, the change of the display size of the image may catch the user's eyes and may hinder the user from determining an appropriate parallax level.

Therefore, for example, a black frame, as shown in FIG. 13, may be added around the stereoscopically displayed stereoscopic image depending on the amount of change of the parallax level to provide indication of an actual display range on the LCD 2 during the stereoscopic display, i.e., the range of the images GL and GR to be trimmed out. With this, the user can concentrate on control of the parallax level, and thus can efficiently control the parallax level.

It should be noted that the frame may also be added during the two-dimensional display in the similar manner as during the stereoscopic display.

If the parallax level is excessively large, appropriate stereoscopic viewing cannot be provided. Therefore, when the parallax level is too large to provide the stereoscopic viewing, the color of the frame may be changed to notify the user to that effect. In this case, the color of the frame may be changed stepwise according to the magnitude of the parallax level, such as to blue, to yellow and to red as the parallax level increases.

Figure 14:
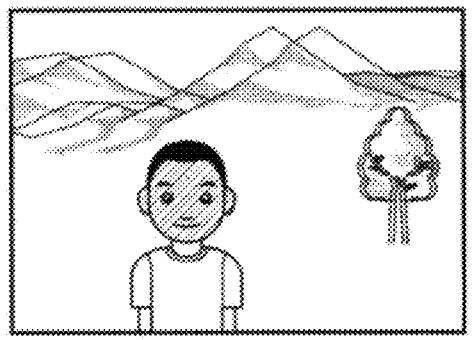
FIG. 14 is a diagram illustrating a state where a color at an area with zero parallax is changed.

Further, in the above-described embodiment, when the parallax level is changed, an area with zero parallax appears on the images GL and GR. In this case, the color of the area with zero parallax in the stereoscopic image G3 may be changed so that the user can tell the area with zero parallax. For example, in the two-dimensionally displayed images GL and GR shown in FIG. 14, if the parallax level is zero at the person's face, the color of the person's face may be changed into a predetermined color (red, for example). In FIG. 14, the color change is indicated by hatching. With this, the user can easily recognize the area with zero parallax. Similarly, during the stereoscopic display, the color of the area with zero parallax in the stereoscopic image G3 may be changed.

If there is an area with zero parallax, the user may be notified of the fact with a sound.

Figure 15:
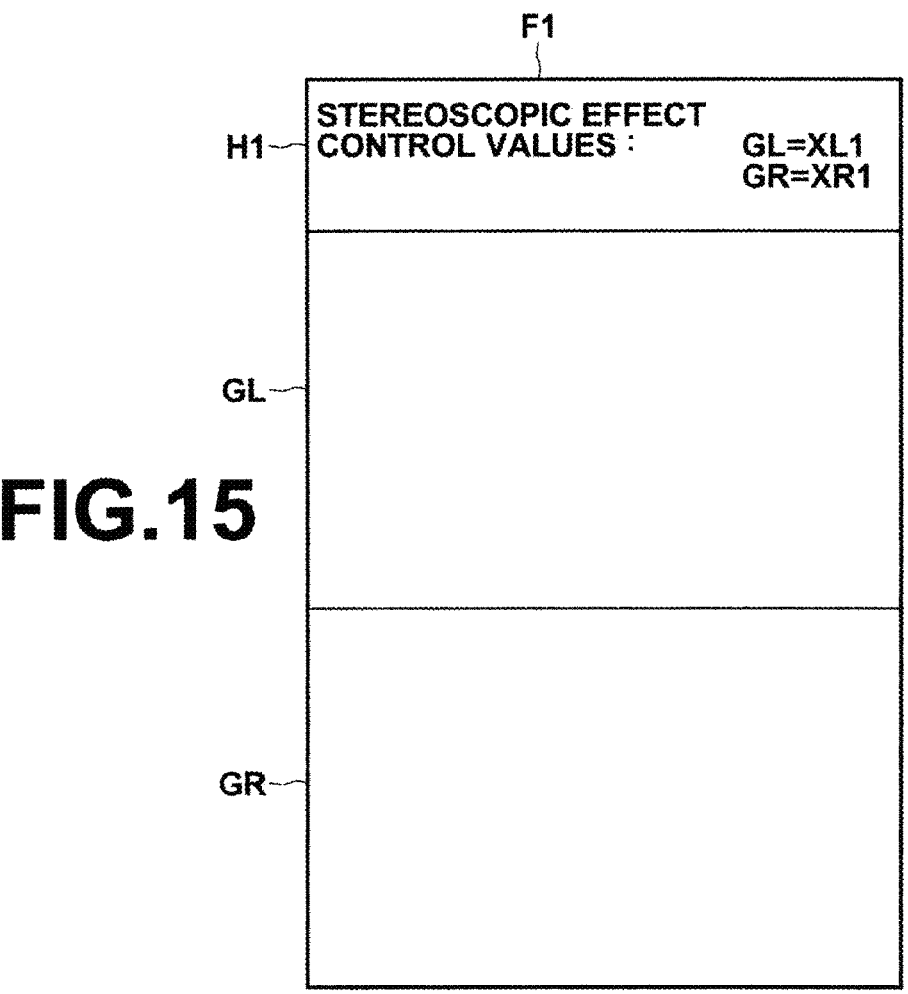
FIG. 15 is a diagram illustrating the file structure of an image file including two connected images.

Although the stereoscopic effect control values are written in the headers HL and HR of the image files FL and FR of the images GL and GR in the above-described embodiment, in some cases, an image file F1 containing the connected images GL and GR, as shown in FIG. 15, may be formed. In this case, the stereoscopic effect control values of the images GL and GR may be written in a header H1 of the image file F1.

The images GL and GR and the stereoscopic effect control values may be stored as separate files. For example, as shown in FIG. 16, the image files and FR of the images GL and GR and a text file T1 with the stereoscopic effect control values written therein may be stored in a folder D1. In this case, a copy of the image files and FR of the original images GL and GR may be stored in the same folder D1 together with the text file T1, or the original images GL and GR may be moved from the folder where they were stored so that the original images GL and GR are stored in the same folder D1 as the text file T1.

In particular, in a case where the images GL and GR are stored as the single image file F1, as shown in FIG. 17, two or more image files F1 and F1' and the text file T1 with the stereoscopic effect control values written therein may be stored in the same folder D1. In this case, the stereoscopic effect control values for all the images stored in the folder D1 are written in the text file T1 with being associated with the image files F1 and F1'.

Further, as shown in FIG. 18, the folder D1 may store only the image files F1 and F1', and a separate folder D2 may store a text file T0 with the stereoscopic effect control values written therein. In this case, the stereoscopic effect control values for all the images stored in the folder D1 are written in the text file T0 with being associated with the image files F1 and F1'.

It should be noted that, although the images are read out from the recording medium 4 to be fed to the image display device 1 in the above-described embodiment, this is not intended to limit the invention. The images may be fed from an image server which is connected to the image display device 1 via a network, or the images may be fed via non-contact communication, etc.

Further, the image display device 1 according to the above-described embodiment may be applied to a binocular (polynocular) photographing device including two or more photographing units. In this case, two or more images obtained through photographing can immediately be displayed on the monitor to allow changing the parallax level before the images are recorded in the recording medium 4. In this case, it is possible to change the parallax level while the live view image before photographing is displayed. In this case, the parallax level may be changed with the display dimension being switched into the two-dimensional display, and then, when the user half-presses the release button, the display dimension of the image may be switched into the stereoscopic display. Further, the display dimension of the image may be switched into the stereoscopic display when a predetermined period of time has elapsed after the parallax level is changed.

The device 10 according to one embodiment of the invention has been described. In addition, the invention may be implemented as a program for causing a computer to function as means corresponding to the three-dimensional processing unit 25, the recording control unit 21 and the display control unit 26 to carry out the processes as shown in FIGS. 7 and 11. The invention may also be implemented as a computer-readable recording medium containing such a program.

What is claimed is:

1. A stereoscopic imaging device, comprising:
   two photographing units for obtaining two images through photographing from different positions;
   a three-dimensional processing unit for generating a stereoscopic image from the two images;
   a display unit capable of a two-dimensional display and a stereoscopic display;
   an input unit for receiving an instruction to change a parallax level;
   a display control unit for changing stereoscopic display of the stereoscopic image into two-dimensional display of the two images overlapped with each other at least while the instruction to change the parallax level is made when the stereoscopic image is stereoscopically displayed as a live view image, two-dimensionally displaying the two images with changing the parallax level of the images in a response to the instruction. to change the parallax level, and changing the two-dimensional display into the stereoscopic display when a predetermined period of time has elapsed after the instruction to change the parallax level is stopped, and adding a black frame to at least right and left areas around the two-dimensionally displayed two images overlapped with each other according to an amount of a change of the parallax level, the black frame indicating a change of an overlapping range between the two images;
   a first determining unit for determining whether the parallax level has been changed to reach a predetermined control limit value; and
   a second determining unit for determining whether the instruction to change the parallax level has been stopped,
   wherein the display control unit continues to change the parallax level until an affirmative determination is made by one of the first determining unit and the second determining unit,
   wherein, if the first determining unit determines that the parallax level has been changed to reach the predetermined control limit value, then changing of the parallax level is stopped, a warning indicating that no further change can be made to a stereoscopic effect is displayed on the display unit, and then the second determining unit determines whether the instruction to change the parallax level has been stopped,
   wherein, if the first determining unit determines that the parallax level has not been changed to reach the predetermined control limit value, then the second determining unit determines whether the instruction to change the parallax level has been stopped,
   wherein, if the second determining unit determines that the instruction to change the parallax level has been stopped, then the three-dimensional processing unit determines whether an instruction to switch a display dimension is made via a manual operation button, and
   wherein a color of the black frame is changed according to a magnitude of the parallax level.

2. The stereoscopic imaging device as claimed in claim 1, wherein the display control unit displays a numerical value indicating the parallax level on the display unit when the stereoscopic display is changed into the two-dimensional display.

3. The stereoscopic imaging device as claimed in claim 1, wherein, in a case where the stereoscopic display is achieved using a backlight control system and the display unit is a liquid crystal display unit, the display control unit drives backlights of the display unit in a three-dimensional mode during the stereoscopic display and drives the backlights in a two-dimensional mode during the two-dimensional display.

4. The stereoscopic imaging device as claimed in claim 1, wherein, when the instruction to change the parallax level is received, the display control unit displays a display range of the two images during the stereoscopic display in a visually recognizable manner on the display unit according to the amount of the change of the parallax level.

5. The stereoscopic imaging device as claimed in claim 1, further comprising a notifying unit for notifying, in a case where an area with substantially zero parallax between the two images is present, that the area with substantially zero parallax is present.

6. The stereoscopic imaging device as claimed in claim 1, further comprising a recording control unit for recording the amount of the change of the parallax level according to an instruction in a recording medium with the amount of the change of the parallax level being associated with the two images.

7. The stereoscopic imaging device as claimed in claim 1, wherein the predetermined control limit value is a fixed value at which each of the two images is shifted to reach an opposite end of another image of the two images.

8. The stereoscopic imaging device as claimed in claim 1, wherein the display control unit continues to change the parallax level until the affirmative determination is made by the first determining unit.

9. The stereoscopic imaging device as claimed in claim 1, wherein, if the second determining unit determines that the instruction to change the parallax level has not been stopped, then the first determining unit determines whether the parallax level has been changed to reach the predetermined control limit value.

10. The stereoscopic imaging device as claimed in claim 1, wherein the first determining unit is configured to determine whether the parallax level has been changed to reach the predetermined control limit value.

11. The stereoscopic imaging device as claimed in claim 1, wherein the display control unit is configured to drive backlights of the display unit in a three-dimensional mode during the stereoscopic display.

12. The stereoscopic imaging device as claimed in claim 11, wherein the display control unit is further configured to drive the backlights in a two-dimensional mode during the two-dimensional display.

13. A stereoscopic imaging method, comprising:
obtaining two images through photographing from different positions;
generating, by a three-dimensional processor, a stereoscopic image from the two images;
stereoscopically displaying a live view image of the stereoscopic image on a display unit capable of a two-dimensional display and a stereoscopic display;
receiving an instruction to change a parallax level;
changing stereoscopic display of the stereoscopic image into two-dimensional display of the two images overlapped with each other at least while the instruction to change the parallax level is made when the stereoscopic image is stereoscopically displayed as a live view image;
two-dimensionally displaying the two images with changing the parallax level of the images in a response to the instruction to change the parallax level;
changing the two-dimensional display into the stereoscopic display when a predetermined period of time has elapsed after the instruction to change the parallax level is stopped;
adding a black frame to at least right and left areas around the two-dimensionally displayed two images overlapped with each other according to an amount of a change of the parallax level, the black frame indicating a change of an overlapping range between the two images;
a first determining whether the parallax level has been changed to reach a predetermined control limit value; and
a second determining whether the instruction to change the parallax level has been stopped,
wherein said changing stereoscopic display continues to change the parallax level until an affirmative determination is made by one of the first determining and the second determining,
wherein, if the first determining determines that the parallax level has been changed to reach the predetermined control limit value, then changing of the parallax level is stopped, a warning indicating that no further change can be made to a stereoscopic effect is displayed on the display unit, and then the second determining determines whether the instruction to change the parallax level has been stopped,
wherein, if the first determining determines that the parallax level has not been changed to reach the predetermined control limit value, then the second determining determines whether the instruction to change the parallax level has been stopped,
wherein, if the second determining determines that the instruction to change the parallax level has been stopped, then the three-dimensional processor determines whether an instruction to switch a display dimension is made via a manual. operation button, and
wherein a color of the black frame is changed stepwise according to a magnitude of the parallax level.

14. The method as claimed in claim 13, wherein the predetermined control limit value is a fixed value at which each of the two images is shifted to reach an opposite end of another image of the two images.

15. The method as claimed in claim 13, wherein said changing stereoscopic display continues to change the parallax level until the affirmative determination is made by the first determining.

16. The stereoscopic imaging method as claimed in claim 13, wherein, after the second determining unit determines that the instruction to change the parallax level has not been stopped, the first determining unit determines whether the parallax level has been changed to reach the predetermined control limit value.

17. The stereoscopic imaging method as claimed in claim 13, further comprising:
notifying, by changing the color of the black frame, that the parallax level is greater than a predetermined level to provide the live view image of the stereoscopic image as the magnitude of the parallax level increases.

18. A non-transitory computer-readable medium storing a program for causing a computer to carry out an image display method comprising:
obtaining two images through photographing from different positions;

generating, by a three-dimensional processor, a stereoscopic image from the two images;

stereoscopically displaying a live view image of the stereoscopic image on a display unit capable of both a two-dimensional display and a stereoscopic display;

receiving an instruction to change a parallax level;

changing stereoscopic display of the stereoscopic image into two-dimensional display of the two images overlapped with each other at least while the instruction to change the parallax level is made when the stereoscopic image is stereoscopically displayed as a live view image;

two-dimensionally displaying the two images with changing the parallax level of the images in a response to the instruction to change the parallax level;

changing the two-dimensional display into the stereoscopic display when a predetermined period of time has elapsed after the instruction to change the parallax level is stopped;

adding a black frame to at least right and left areas around the two-dimensionally displayed two images overlapped with each other according to an amount of a change of the parallax level, the black frame indicating a change of an overlapping range between the two images;

a first determining whether the parallax level has been changed to reach a predetermined control limit value; and a second determining whether the instruction to change the parallax level has been stopped, wherein said changing stereoscopic display continues to change the parallax level until an affirmative determination is made by one of the first determining and the second determining, wherein, if the first determining determines that the parallax level has been changed to reach the predetermined control limit value, then changing of the parallax level is stopped, a warning indicating that no further change can be made to a stereoscopic effect is displayed on the display unit, and then the second determining determines whether the instruction to change the parallax level has been stopped, wherein, if the first determining determines that the parallax level has not been changed to reach the predetermined control limit value, then the second determining determines whether the instruction to change the parallax level has been stopped, wherein, if the second determining determines that the instruction to change the parallax level has been stopped, then the three-dimensional processor determines whether an instruction to switch a display dimension is made via a manual operation button, and wherein a color of the black frame is changed stepwise according to a magnitude of the parallax level.

19. The non-transitory computer-readable medium as claimed in claim 18, wherein the predetermined control limit value is a fixed value at which each of the two images is shifted to reach an opposite end of another image of the two images.

20. The non-transitory computer-readable medium as claimed in claim 18, wherein said changing stereoscopic display continues to change the parallax level until the affirmative determination is made by the first determining.

* * * * *